2,807,655

HYDRATION OF OLEFINS OVER TUNGSTIC ACID-ALUMINA CATALYSTS

Laurence Roy Pittwell, Ottawa, Ontario, Canada, assignor to Imperial Chemical Industries Limited, a corporation of Great Britain No Drawing. Application October 30, 1953,
Serial No. 389,458

Claims priority, application Great Britain
September 15, 1950

7 Claims. (Cl. 260—641)

This application is a continuation-in-part of co-pending application Serial No. 246,505, filed September 13, 1951 and now abandoned.

This invention relates to the direct catalytic hydration of olefines to alcohols.

It has already been proposed to carry out such direct catalytic hydration over a catalyst consisting substantially of a blue oxide of tungsten, and reference may be made to British patent specification Numbered 622,937, which discloses inter alia the treatment of such a catalyst by pelleting a tungstic acid material at high pressure.

The present invention relates to a process carried out in the presence of a catalyst comprising an oxide of tungsten as its main constituent and having improved mechanical strength over catalysts of this type used heretofore. By providing a catalyst having an improved mechanical strength, catalyst disintegration during use is decreased, and, in consequence, the decrease of catalyst activity with increased operating time is less marked.

According to the present invention, there is provided a process for the direct catalytic hydration of olefines, which comprises the step of contacting an olefine with water at an elevated temperature and pressure in the presence of a catalyst comprising tungstic acid and 0.01% to 10% by weight of an oxide selected from the group consisting of alumina, titania, uranium oxide, thoria, indium sesquioxide and tellurium dioxide.

The term "tungstic acid" as used in this specification is meant to cover the compound of the formula $WO_3$ in its anhydrous and hydrated forms.

The catalysts employed in the process of the present invention disintegrate to a smaller extent than the catalysts previously disclosed in the art, in processes of olefine hydration. In consequence, since there is a marked improvement in the catalysts retaining their shape, and a decrease in the quantity of finely-divided solid produced, the flow of reactants is impeded to a smaller extent than when using catalysts of the prior art; thus, in the process of the present invention, the rate of alcohol production decreases less rapidly than in the previously disclosed processes.

Of the oxides which we have found to be most effective in improving the mechanical strength of tungsten oxide catalysts for use in the present invention, we prefer to use alumina.

The quantity of the oxide which is added to or co-precipitated with the tungstic acid may vary between wide limits, but it is preferred to use a minor amount. By a "minor amount" we mean an amount of 0.01 to 10% by weight of the total material, and an amount of 5 to 10% will be preferable in the majority of cases.

A catalyst material for use in the process of the present invention may be prepared by mixing a solution of a salt, preferably the nitrate of a metal, with a powdered tungstic acid so as to form a slurry, drying the slurry and then decomposing the salt in the mass to the oxide by heating, after which the resultant mixture, containing a tungstic acid and the oxide of the added metal, for example, alumina, is granulated and, if desired, pelleted in the same way as would have been done with the tungstic acid material containing no added metal oxide. The granules or pellets obtained may be reduced before use to produce a blue oxide of tungsten from the tungstic acid.

Thus, with alumina, which is the preferred additive, a suitable method of preparing the catalyst is as follows. Aluminum nitrate is dissolved in distilled water and the requisite amount of tungstic acid is introduced into the solution in the form of a powder. The product is stirred until it is in the form of a smooth homogeneous paste. It is then dried at a temperature of, for example, 120° C., calcined at a higher temperature of, for example, 400° C., and then broken down into small pieces but preferably not into fine powder. The small pieces may then be pelleted or granulated as desired.

By this process a product containing 5% $Al_2O_3$ and 95% $H_2WO_4$ before calcination, and 5.5% $Al_2O_3$ after calcination, was obtained. This material was mixed with 2% by weight of graphite as a pelleting lubricant and compressed into ⅛″ x ⅛″ cylindrical pellets under a pressure of 50 to 60 tons per square inch.

The average crushing strength of pellets prepared as aforesaid was measured for two different samples and found to be 191 lbs. in one sample and 190 lbs. in the other, for a pellet in the vertical position, whereas the average crushing strength in the vertical position of pellets not containing an additive according to the invention but made under the same pelleting pressure was found to be 150 lbs.

The catalyst pellets prepared as described above were tested under conditions similar to those used in the hydration of propylene to isopropanol. The pellets were contacted with water and aqueous isopropanol solution in an autoclave at a temperature of 270° C., and a pressure of 250 atmospheres. Whereas under these conditions an oxide of tungsten catalyst without an added metal oxide was found to be disintegrated and/or eroded to some extent, a catalyst produced as disclosed above was found to be relatively resistant to disintegration and erosion.

It is to be understood that any known or suitable alternative method of incorporating the additive into the catalyst may be used.

Thus, still concentrating, by way of example, on the addition of alumina, this may be achieved by mixing tungstic oxide powder with precipitated and washed alumina gel, or by impregnating tungstic oxide pellets with a solution of an aluminium salt, preferably the nitrate, and decomposing the impregnated additive to the oxide by suitable calcination. This latter method has an added interest due to the fact that it permits a finished pelleted tungstic oxide catalyst to be converted into one of improved mechanical properties.

Instead of pelleting the catalyst, it may be made into granules in any other known or suitable way, for example by breaking down a cake of the dried and calcined material to the desired granule size.

The process of the present invention may be used for the hydration of olefines containing not more than four carbon atoms. Thus, ethylene may be reacted with water at a temperature within the range of 250° C. to 350° C. and at a pressure within the range of 200 atmospheres to 500 atmospheres. Propylene may be hydrated to isopropanol by reaction with water at a temperature within the range of 250° C. to 290° C., and at an elevated pressure, which may be, for example, 250 atmospheres. Isobutene may be hydrated to tertiary butanol by reaction with water at an elevated temperature within the range of 160° C. to 220° C., and at an elevated pressure. Similarly, at temperatures within the range of 230° C. to 270° C., butene-1 and butene-2 may be hydrated to sec.-butanol. In these hydrations, using C₄ olefines, it is suitable to work at an elevated pressure of 250 atmospheres.

EXAMPLE 1

18.4 kg. of aluminium nitrate nonahydrate crystals were dissolved in distilled water so that the final volume of solution was 21 litres at 40° C. 47.5 kg. of tungstic acid powder were mixed in a suitable mixer, such as a Baker-Perkins "Universal" Mixer with sigmoidal blades carried on a horizontal shaft or a Manesty Granular Incorporator, with 15 litres of the above aluminium nitrate solution; another 3 litres of solution were added after 7½ minutes' mixing and the final 3 litres after 15 minutes' mixing, after which mixing was continued for another hour. The product was then a smooth paste. The mixing times are not rigid and can be varied, so long as a smooth homogeneous mix is obtained. The product was then dried at 120° C. and subsequently calcined for 8 hours at 300° C. The calcined material was broken down until it all passed a screen with $\frac{1}{16}$" diameter circular holes. Some other type of screen such as, say, a 12 B. S. screen might have been used; the general rule is that the material should preferably not be broken down into a very fine powder. The material was then mixed with 2% of graphite as a pelleting lubricant and compressed into ⅛" x ⅛" cylindrical pellets under a pressure of 50 to 60 tons per square inch. The necessary percentage of graphite is not rigidly fixed. Thus, 0.5% may be sufficient. The product of the particular method of preparation outlined was found to contain 5% $Al_2O_3$ and 95% $H_2WO_4$ before calcination and 5.5% $Al_2O_3$ after calcination.

The catalyst was tested in the hydration of propylene at a temperature of 270° C. and a pressure of 250 atmospheres. The feed rate of propylene in the first part of the experiment was 0.61 litre per litre of catalyst-filled space per hour and the feed rate of water was 2.39 litres per litre of catalyst-filled space per hour. After operating for 200 hours, the propylene feed rate was increased to 1.85 litres per litre of catalyst-filled space per hour, and the water feed rate to 7.15 litres per litre of catalyst-filled space per hour. From these rates it should be noted that the water:propylene weight ratio was 7:1. The amount of isopropanol produced was measured as the grams of isopropanol obtained per litre of catalyst-filled space per hour. The results are given in Table I below.

Table I

| Life (hours) | Total throughout (litres/litre of catalyst/hour) | Isopropanol production (gm./litre of catalyst/hour) |
| --- | --- | --- |
| 0–73 | 3.0 | 162 |
| 113–195 | 3.0 | 185 |
| 270–460 | 9.0 | 277 |
| 700–900 | 9.0 | 234 |

In comparison an olefine hydration catalyst comprising pelleted tungstic acid alone, which possessed an initial activity substantially identical with that of the $Al_2O_3/WO_3$ catalyst of the present invention, gave only 135 grams of isopropanol per litre of catalyst filled space per hour after an operating period of the order of 700 hours. It will be observed that this figure is much less than the comparable result obtained using the $Al_2O_3/WO_3$ catalyst.

EXAMPLE 2

A catalyst was prepared as described in Example 1 except that the ignition was carried out at 400° C. When used for propylene hydration under the conditions given in Example 1 the following results were obtained.

Table II

| Life (hours) | Isopropanol production (gm./litre of catalyst/hour) |
| --- | --- |
| 0–63 | 363 |
| 270–325 | 308 |
| 585–650 | 224 |

When using a catalyst comprising pelleted tungstic acid alone, the results given in Table III were obtained.

Table III

| Life (hours) | Isopropanol production (gm./litre of catalyst/hour) |
| --- | --- |
| 0–70 | 351 |
| 70–122 | 314 |
| 252–312 | 191 |
| 427–488 | 170 |
| 670–739 | 135 |

It will be seen that although the initial activities of the catalysts are substantially the same, the activities after prolonged operation are markedly different. This is because the amount of disintegration of the catalyst comprising pelleted tungstic acid alone is much greater than the amount of disintegration suffered by the $Al_2O_3/WO_3$ catalyst.

To substantiate this, the catalysts from the experiments described above were examined in order to determine the extent of disintegration. Samples of catalyst were examined at regular intervals throughout the catalyst bed. The results for the $Al_2O_3/WO_3$ catalyst are given in Table IV below.

Table IV

| Mid-point of sample from top of bed (feet) | Percent by weight of catalyst in whole pellets |
| --- | --- |
| 1.0 | 75.6 |
| 2.5 | 91.1 |
| 4.25 | 93.8 |
| 6.0 | 91.2 |
| 8.0 | 90.4 |
| 9.0 | 86.7 |

The figures for the catalysts comprising pelleted tungstic acid are given in Table V below.

Table V

| Mid-point of sample from top of bed (feet) | Percent by weight of catalyst in whole pellets |
| --- | --- |
| 1.25 | 74.2 |
| 2.75 | 76.2 |
| 4.5 | 71.3 |
| 6.9 | 60.9 |
| 8.6 | 54.3 |

It will be seen that in every part of the catalyst bed an increased amount of disintegration occurs when using the catalyst comprising pelleted tungstic acid.

What is claimed is:
1. A process for the direct catalytic hydration of olefines which comprises the step of contacting an olefine with liquid water at an elevated temperature from 160° to 350° C. and pressure from 200 to 500 atmospheres in the presence of a catalyst comprising tungstic acid and 0.01% to 10% by weight of alumina in intimate admixture therewith, said catalyst having been formed into pellets and subjected to a pressure from about 50 to about 60 tons per square inch.

2. The process of claim 1 wherein said alumina is present in an amount from 5% to 10% by weight.

3. The process of claim 1 wherein said alumina is present in an amount of the order of 5% by weight.

4. A process according to claim 1 wherein said olefin is propylene and said temperature is within the range of 250° to 290° C.

5. The process of claim 1 wherein said olefin is ethylene and said temperature is within the range of 250° to 350° C.

6. The process of claim 1 wherein said olefin is isobutene and said temperature is within the range of 160° to 220° C.

7. The process of claim 1 wherein said olefin is selected from the group consisting of butene-1 and butene-2 and wherein said temperature is within the range of 230° to 270° C.

References Cited in the file of this patent

UNITED STATES PATENTS

| 1,998,220 | Brown | Apr. 16, 1935 |

FOREIGN PATENTS

| 320,462 | Italy | Aug. 22, 1934 |
| 650,475 | Great Britain | Feb. 28, 1951 |
| 473,294 | Canada | May 1, 1951 |

OTHER REFERENCES

Fiat Final Report #968, April 2, 1947; pgs. 11, 25–7.